United States Patent
Devlin et al.

(10) Patent No.: US 11,746,030 B2
(45) Date of Patent: Sep. 5, 2023

(54) AEROBIC GRANULAR SLUDGE IN CONTINUOUS FLOW REACTORS

(71) Applicant: University of Manitoba, Winnipeg (CA)

(72) Inventors: Tanner R. Devlin, Winnipeg (CA); Jan A. Oleszkiewicz, Winnipeg (CA)

(73) Assignee: University of Manitoba, Winnipeg (CA)

( * ) Notice: Subject to any disclaimer, the term of this patent is extended or adjusted under 35 U.S.C. 154(b) by 271 days.

(21) Appl. No.: 17/043,248

(22) PCT Filed: Mar. 28, 2019

(86) PCT No.: PCT/CA2019/050386
§ 371 (c)(1),
(2) Date: Sep. 29, 2020

(87) PCT Pub. No.: WO2019/195918
PCT Pub. Date: Oct. 17, 2019

(65) Prior Publication Data
US 2021/0355010 A1    Nov. 18, 2021

Related U.S. Application Data

(60) Provisional application No. 62/655,981, filed on Apr. 11, 2018.

(51) Int. Cl.
*C02F 3/30* (2023.01)
*C02F 3/00* (2023.01)
*C02F 11/04* (2006.01)

(52) U.S. Cl.
CPC ............ *C02F 3/301* (2013.01); *C02F 3/006* (2013.01); *C02F 11/04* (2013.01); *C02F 3/308* (2013.01);
(Continued)

(58) Field of Classification Search
CPC .......... C02F 3/301; C02F 3/006; C02F 11/04; C02F 3/308; C02F 2201/007;
(Continued)

(56) References Cited

U.S. PATENT DOCUMENTS

| 4,839,052 | A | * | 6/1989 | Maree ...................... | C02F 3/28 210/603 |
| 5,514,278 | A | * | 5/1996 | Khudenko ................ | C02F 3/28 210/625 |
| 2009/0090670 | A1 | | 4/2009 | Elefritz et al. | |

FOREIGN PATENT DOCUMENTS

CN        202558697        11/2012

OTHER PUBLICATIONS

"Cultivation of aerobic granular sludge in continuous flow under various selective pressure", Devlin et al., available online Jan. 11, 2018, pp. 281-287. https://doi.org/10.1016/j.biortech.2018.01.056.*
(Continued)

*Primary Examiner* — Fred Prince
(74) *Attorney, Agent, or Firm* — Kyle R Satterthwaite; Ryan W Depuis; Ade & Company Inc.

(57) ABSTRACT

Aerobic granular sludge (AGS) is an energy efficient and compact biological wastewater treatment process. There is only one commercially available AGS technology which utilizes sequencing batch reactors (SBR). Many existing wastewater treatment facilities consist of long, continuous flow reactors that would not be readily suitable for retrofit to SBR. Therefore, a continuous flow process is preferred for municipalities that cannot economically invest in the only commercially available SBR technology (i.e., Nere-da®). Lab- and pilot-scale experimentation has demonstrated that stable granulation can be achieved in a continuous flow configuration GT suitable for retrofit into existing infrastructure. An anoxic/anaerobic/aerobic configuration can be designed and stably operated for conversion of flocculent
(Continued)

biomass to AGS Preliminary pilot-scale results on primary effluent from a municipal wastewater treatment facility indicated that granules of 0.2-0.5 mm, SVI<75 mL/g, and $SV_{30\ min}/SVI_{5\ min}>70\%$ can be formed within a month of steady operation.

22 Claims, 5 Drawing Sheets

(52) U.S. Cl.
CPC .... *C02F 2201/007* (2013.01); *C02F 2209/04* (2013.01); *C02F 2209/14* (2013.01); *C02F 2209/15* (2013.01); *C02F 2209/22* (2013.01); *C02F 2303/06* (2013.01); *Y02W 10/10* (2015.05)

(58) Field of Classification Search
CPC .............. C02F 2209/04; C02F 2209/14; C02F 2209/15; C02F 2209/22; C02F 2303/06; Y02W 10/10
USPC ....... 210/605, 615, 616, 617, 623, 630, 259, 210/260, 631, 903
See application file for complete search history.

(56) References Cited

OTHER PUBLICATIONS

"The principal and full-scale application of reversed A2/O process for removing nitrogen and phosphorus from municipal wastewater", Bi et al, (2009), 2009 3rd International Conference on Bioinformatics and Biomedical Engineering, Beijing, China Jun. 11-13, 2009, pp. 1-4. https://doi.org/10.1109/ICBBE.2009.5163643.*

* cited by examiner

AEROBIC GRANULAR SLUDGE IN CONTINUOUS FLOW REACTORS

BACKGROUND

Aerobic granular sludge (AGS) is an advanced biological process for energy efficient wastewater treatment in small footprints (Carucci et al., 2010; Lee et al., 2010). AGS offers several advantages over conventional activated sludge (CAS) including excellent settling, high biomass retention and therefore high volumetric loading, reduced oxygen demand, and lower sludge yields (de Kreuk et al., 2010; Ni and Yu, 2010). Furthermore, due to the dense and compact structure of granules, AGS offers higher resilience to drastic changes in operating conditions such as temperature, organic loads, and toxic compounds.

Sequencing batch reactors (SBR) have been the technology of choice for most AGS studies, as well as for the only commercially available AGS process (Arrojo et al., 2004; Beun et al., 1999; Wagner and da Costa, 2013). Sequencing batch reactors differ from most CAS processes, which use continuous flow reactors (CFR), because SBRs combine all the treatment steps into a single basin. Instead of having multiple basins dedicated to different oxidation or reduction conditions, SBRs change operational parameters over time (e.g., anaerobic influent addition→aeration→settling→effluent discharge→repeat).

It was generally agreed upon that SBRs benefitted AGS and that granulation in CFRs would not be stable. However, recent studies have demonstrated the potential for successful and stable granulation in CFRs (Devlin and Oleszkiewicz, 2018a). These developments are important since most large wastewater treatment plants (WWTP) practicing nutrient removal and requiring increased capacity are large CFRs, such as plug-flow reactors (PFR) or completely-mixed reactors (CMR; Oleszkiewicz et al., 2015). In these cases, existing infrastructure would not be suitable for retrofit to SBRs and it would be uneconomical to implement AGS unless a CFR was developed.

Accordingly, it would be desirable to develop a suitable process design and operational parameters for AGS in a CFR, which could potentially enable high-levels of industrial and/or municipal wastewater treatment (i.e., carbon, nitrogen, phosphorus, and solids removal) with a smaller footprint and lower energy requirements than CAS processes.

SUMMARY OF THE INVENTION

According to one aspect of the invention, there is provided an activated granular sludge continuous flow reactor (AGS-CFR) comprising:

an anaerobic zone having inlet through which influent is introduced to the AGS-CFR and said anaerobic zone comprising one or more completely-mixed reactors (CMR) or plug-flow reactor (PFR);

an aerobic zone situated downstream of anaerobic zone and comprising at least one PFR or multiple CMR in series;

an anoxic zone situated upstream of the anaerobic zone and said anoxic zone comprising one or more additional CMR or PFR;

a solids separation device situated downstream of the aerobic zone; and a return line having an inlet arranged to receive a supply of return activated sludge from the solids separation device and an outlet that feeds into the anoxic zone to deliver at least some of said return activated sludge thereto, wherein said return activated sludge includes aerobic granular sludge.

According to another aspect of the invention, there is provided a method of treating wastewater in a continuous flow reactor, said method comprising:

introducing said wastewater into an anaerobic zone of said continuous flow reactor, said anaerobic zone residing downstream of an anoxic zone of said continuous flow reactor and upstream of an aerobic zone of said continuous flow reactor; and from a solids separation device of said continuous flow reactor that is situated downstream of said aerobic zone, collecting a supply of return activated sludge that includes aerobic granular sludge, and directing at least some said return activated sludge into the anoxic zone.

BRIEF DESCRIPTION OF THE DRAWINGS

One embodiment of the invention will now be described in conjunction with the accompanying drawings in which:

FIG. 1($b$) shows AGS during transition from flocs to granules from a pilot continuous flow reactor (CFR) treating primary effluent from a municipal wastewater treatment facility.

FIG. 1($c$) shows a sludge volume index (SVI) for the depicted biomass, as well as for the activated sludge (AS) biological nutrient removal system for a full-scale treatment plant where a pilot AGS CFR is located.

DETAILED DESCRIPTION

1. Characteristics of Aerobic Granular Sludge
1.1. Physical

Figures 1A, 1B, 1C:
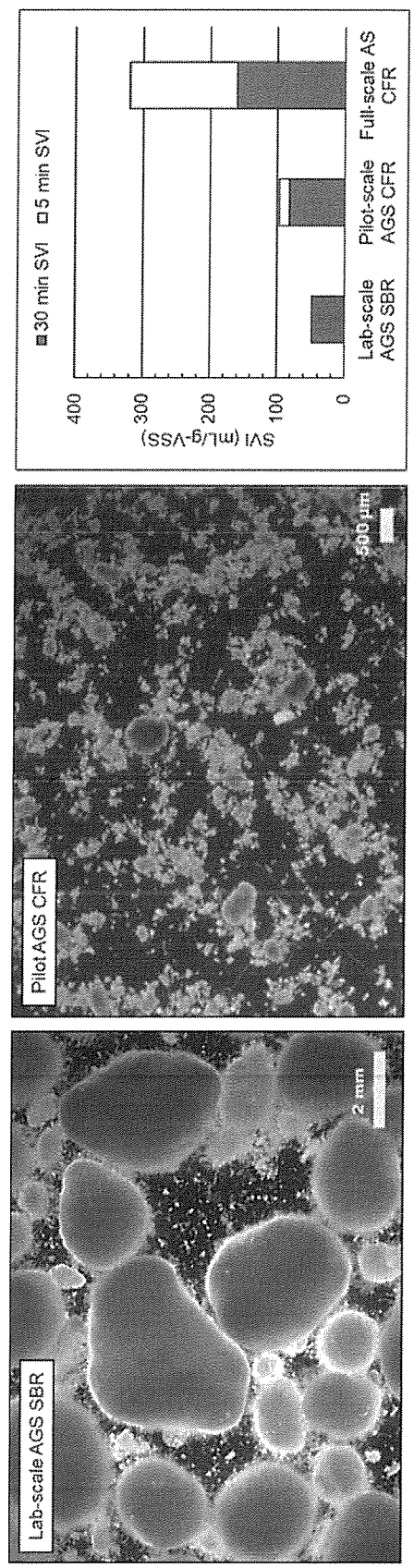
FIG. 1($a$) shows steady-state aerobic granular sludge (AGS) from a lab-scale sequencing batch reactor (SBR).

Aerobic granular sludge is a tightly aggregated mass of microorganisms, extracellular polymeric substances (EPS), and inorganic material—FIG. 1. These dense chemical-microbial consortia are typically spherical or ellipsoidal in shape and ideally have a smooth outer surface (Chen et al., 2008). Average granule diameter has been reported between 0.2-5 mm, and granules as large as 23 mm have been observed in laboratory conditions (Dangcong et al., 1999; Tay et al., 2001a, 2001b; Torregrossa et al., 2007; Zhu and Wilderer, 2003). However, granules cultivated on municipal wastewater typically have diameters between 0.2-1.3 mm (Derlon et al., 2016). Large size and high density of granules allow for rapid settling times and low sludge volume index (SVI) of 20-80 mL/g (Su et al., 2012). Specific gravity of granules has been reported from 1.004-1.1, which is higher than typically reported for flocculent biomass (i.e., 1.002-1.006; Li et al., 2009; Shi et al., 2009; Su, Cui and Zhu, 2012). Actual in situ settling velocities of granules are affected by temperature, viscosity, and geometric properties. Large granules (i.e., average diameter=2.3±0.5 mm) from a lab-scale reactor had settling velocities of 84 m/h at 5° C. and 145 m/h at 40° C. Small granules (i.e., average diameter=1.5±0.3 mm) had settling velocities of 35 m/h at 5° C. and 63 m/h at 40° C. (Winkler et al., 2012).

1.2. Chemical

Extracellular polymeric substances, such as proteins, polysaccharides, humic substances, as well as DNA and RNA, are a critical component of AGS. In general, EPS shape and provide structural support for biofilms, act as a buffer layer against harsh external environments, and can also be used by bacteria as an energy source during periods of low substrate availability (Flemming and Wingender, 2003; Wang et al., 2006). In AGS the gel-forming exopolysaccharides, such as alginate-like exopolymer, have been proposed as the main structural material (Seviour et al., 2012). The alginate-like exopolymer in AGS was observed to be composed of gluronic acid blocks, which form a continuous structure that is more resistant to deformation than EPS in flocculent biomass (Lin et al., 2013).

The exact roles of different EPS components in AGS are still being assessed. In acetate-fed granules, proteins and β-D-glucopyranose polysaccharides were observed to form the core whereas α-D-glucopyranose polysaccharides accumulated in the outer layers (Chen et al., 2007). In phenol-fed granules, selective enzymatic hydrolysis of proteins, lipids, and α-polysaccharides had a minimal effect upon granules integrity while selective hydrolysis of β-polysaccharides fragmented the granules (Adav et al., 2008). Conversely, other studies have observed that selective hydrolysis of proteins resulted in disintegration of granules (Xiong and Liu, 2013). It is generally agreed upon that low protein to polysaccharide ratios in AGS leads to granule instability (Corsino et al., 2015; Zhang et al., 2011).

Components of EPS from AGS were observed to induce the formation of struvite, a phosphorus precipitate commonly found in aerobic granules (Lin et al., 2012). Alginate-like exopolysaccharides, specifically, were found to induce the formation of ammonium and/or potassium magnesium phosphates (i.e., struvite as $NH_4MgPO_4.6H_2O$ or $KMgPO_4.6H_2O$). Interestingly, it has been demonstrated that iron, magnesium, and aluminium remained constant in granules during start-up whereas calcium increased (Liu and Tay, 2004; Qin et al., 2004). It had also been observed that granules containing calcium precipitates had stronger structures and larger diameters (Qin et al., 2004; Ren et al., 2008). Other chemical exchange mechanisms, such as the exchange of potassium from $KMgPO_4.6H_2O$ in the granular sludge complex with ammonium in bulk solution, have been observed and contributed to the overall removal of nitrogen (Lin et al., 2012). It has been suggested that small increases in the fraction of precipitates, as low as 1% to 5% of total granule volume, would significantly increase the density of aerobic granules and thereby their settling velocity (Winkler et al., 2013). Phosphorus precipitates, such as biologically induced hydroxyl-apatite (i.e., $Ca_5(PO_4)_3OH$), have been repeatedly detected in the core of aerobic granules (Angela el al., 2011; Huang et al., 2015).

1.3. Microbiological

Granules are characterized by a concentric, multi-layered structure which contain channels and pores for the transport of oxygen and substrates (Paul and Liu, 2012). Typically, granules consist of an outer aerobic layer overtop anoxic/anaerobic layers. Thus, oxygen utilizing microorganisms such as heterotrophs, ammonium and nitrite oxidizing bacteria (AOB; NOB), and glycogen- or phosphate-accumulating organisms (GAO; PAO) grow in the outer, aerobic layer while deeper layers contain denitrifying heterotrophs, GAO, and PAO (Adav et al., 2008, 2007; Adav and Lee, 2008; Tay et al., 2002). Various other specialty microbes such as anammox, denitrifying autotrophic methane oxidizing archaea and bacteria, as well as methanogens have also been observed within AGS (Bassin et al., 2012; Winkler et al., 2012). Dead cells and precipitates can also exist under anaerobic conditions near the core of aerobic granules (de Kreuk et al., 2005).

Microbial diversity as well as community structure directly influence the performance of AGS. For instance, analysis of full-scale granular biomass indicated that PAO have a higher density than GAO, leading to significantly higher settling velocities for PAO dominated granules (Winkler et al., 2013). Thus, out-selection of GAO is one method of improving AGS performance from a microbiological standpoint. Furthermore, the kinetic rates and stoichiometry of individual metabolic pathways govern granule stability. Higher microbial community yields would make granules more susceptible to mass transfer limitations, resulting from excessive growth of microorganisms and their byproducts such as EPS (Devlin et al., 2017; di Biase et al., 2017). Furthermore, based on the number of significantly enriched proteins assigned to Clusters of Orthologous Groups, it was shown that the AGS metagenome diverts a significant amount of energy to transport and metabolism related proteins (i.e., for carbohydrates, amino-acids, coenzymes, lipids, and inorganic ions) while flocculent communities had more proteins related to translation, ribosomal structure, biogenesis, energy production, and conversion (Barr et al., 2016). This means that AGS communities divert energy away from growth to regulate microbial community metabolisms, resulting in lower biomass yields.

2. Mechanisms of Granulation 2.1. Organic Loading Rate

The organic loading rate (OLR) is defined as the ratio between organic substrate load, calculated as the product of flow and substrate concentration, and volume of the reactor receiving the substrate. A dichotomy exists in the literature as to the importance of OLR during granulation. The contrasting opinions likely originate from two distinct methods of AGS operation. The first method of operation is a completely aerobic AGS processes, where the entire cycle is aerated apart from settling and effluent discharge. In these cases, much higher OLR seemed to play a role in aerobic granulation. The recommended OLR for granulation was 2.5 kg-$COD/m^3/d$, while it was also suggested that OLR below 2 kg-$COD/m^3/d$ should be avoided (Kim et al., 2008; Li et al., 2008, 2011; Liu and Tay, 2002). Some studies have demonstrated that completely aerobic AGS processes could granulate at OLR below 2 kg-$COD/m^3/d$, although almost an entire year was required to obtain mature granules (Wang et al., 2009).

The role of OLR seemed to decrease with the introduction of an anaerobic upflow influent distribution period. Typically, a 50 min period of anaerobic influent distribution is utilized for domestic wastewater (Derlon et al., 2016). In these cases, it had been demonstrated that stable aerobic granules have been generated at lower OLR compared with completely aerobic AGS processes. In fact, a full-scale reactor treating municipal wastewater generated stable granules with OLR ranging from 0.65-0.85 kg-COD/m$^3$/d (Pronk et al., 2015b). Similarly, stable granules have been cultivated in a month on proteinaceous substrate at an OLR of 1.4 kg-COD/m$^3$/d (Devlin et al., 2017). Mature AGS was also cultivated within three weeks at an OLR of 1.4 kg-COD/m$^3$/d while treating effluent from an anaerobic process treating brewery wastewater (Corsino et al., 2016). Based on the reported studies, it can be concluded that higher OLR is not a requirement for granulation unless the AGS process is continuously aerated.

2.2. Selective Wasting

Selective wasting is considered to favour for granulation (Qin et al., 2004). To simplify operation, most lab-scale studies couple selective wasting with effluent discharge. In these cases it had been demonstrated that shorter settling times, or low critical settling velocities (i.e., settling time divided by distance required to avoid washout), enhanced aerobic granulation (Hu et al., 2005; Jiang et al., 2002). In one study, critical settling velocities of 2.1-4.2 m/h were examined (Adav et al., 2009). It was observed that 2.1 m/h resulted in premature washout of certain non-flocculated strains, while 3.0-4.2 m/h generated well performing AGS. It was also observed that too rapid a decrease in settling time leads to washout of desired bacterial guilds such as PAO, AOB, and NOB (Weissbrodt et al., 2013). Other studies have used critical settling velocities of 3-5 m/h to successfully cultivate stable AGS (Corsino et al., 2016; Devlin et al., 2017).

Full-scale application of AGS technology would preferably have selective wasting occurring separately from effluent discharge in order to avoid high effluent TSS (Bassin et al., 2012; Henriet et al., 2016; Winkler et al., 2011). In one study, it was demonstrated with fluorescent in situ hybridization that more dense granules located at the bottom of the settled sludge bed contained considerably more PAO compared to the lighter granules on top which were dominated by GAO (Winkler et al., 2011). Thus, by selectively wasting biomass exclusively from the top of the settled sludge bed TP removal efficiency was increased from 71% to near 100%. This is because PAO were selectively retained over GAO, allowing more influent organic substrate to contribute towards TP removal. It has also been demonstrated that biomass could be selectively wasted during the upflow anaerobic influent distribution period, with wastewater upflow velocities less than 5.9 m/h recommended (Derlon et al., 2016). Separating selective wasting from effluent discharge can result in effluent TSS less than 5 mg/L (Niermans et al., 2014).

3. Factors Affecting Granular Sludge Stability 3.1. Hydrodynamic Shear Force

Hydrodynamic shear forces may be defined as the forces generated due to the friction between the bulk liquid and biomass surface. Generally, the hydrodynamic shear force had been quantified by the upflow superficial air velocities in lab-scale systems. Minimum upflow superficial air velocities from 1.2-2.4 cm/s had been recommended for stable AGS in completely aerated processes (Chen et al., 2007; Liu and Tay, 2002; McSwain et al., 2004). However, like OLR, there exists a dichotomy between completely aerated AGS processes and those with an anaerobic influent distribution period with regards to the role of hydrodynamic shear forces. For instance, stable aerobic granules have been operated with upflow superficial air velocities below 0.5 cm/s when anaerobic influent distribution has been utilized (Corsino et al., 2016; Devlin et al., 2017). When influent is distributed under anaerobic conditions simple organic substrates are taken up and stored by accumulating microorganisms (i.e., GAO and PAO), thereby reducing the load of bioavailable organic carbon in bulk solution under aerobic conditions. For this reason there may be a reduced need for higher shear forces which would otherwise be required to scour the surface of granules and remove rapidly growing aerobic heterotrophs resulting in the washout of undesirable microorganisms in completely aerated systems. Therefore it is important to note that higher hydrodynamic shear forces are not a requirement for aerobic granulation unless the process is completely aerated.

3.2. Anaerobic Substrate Utilization

Figure 2:
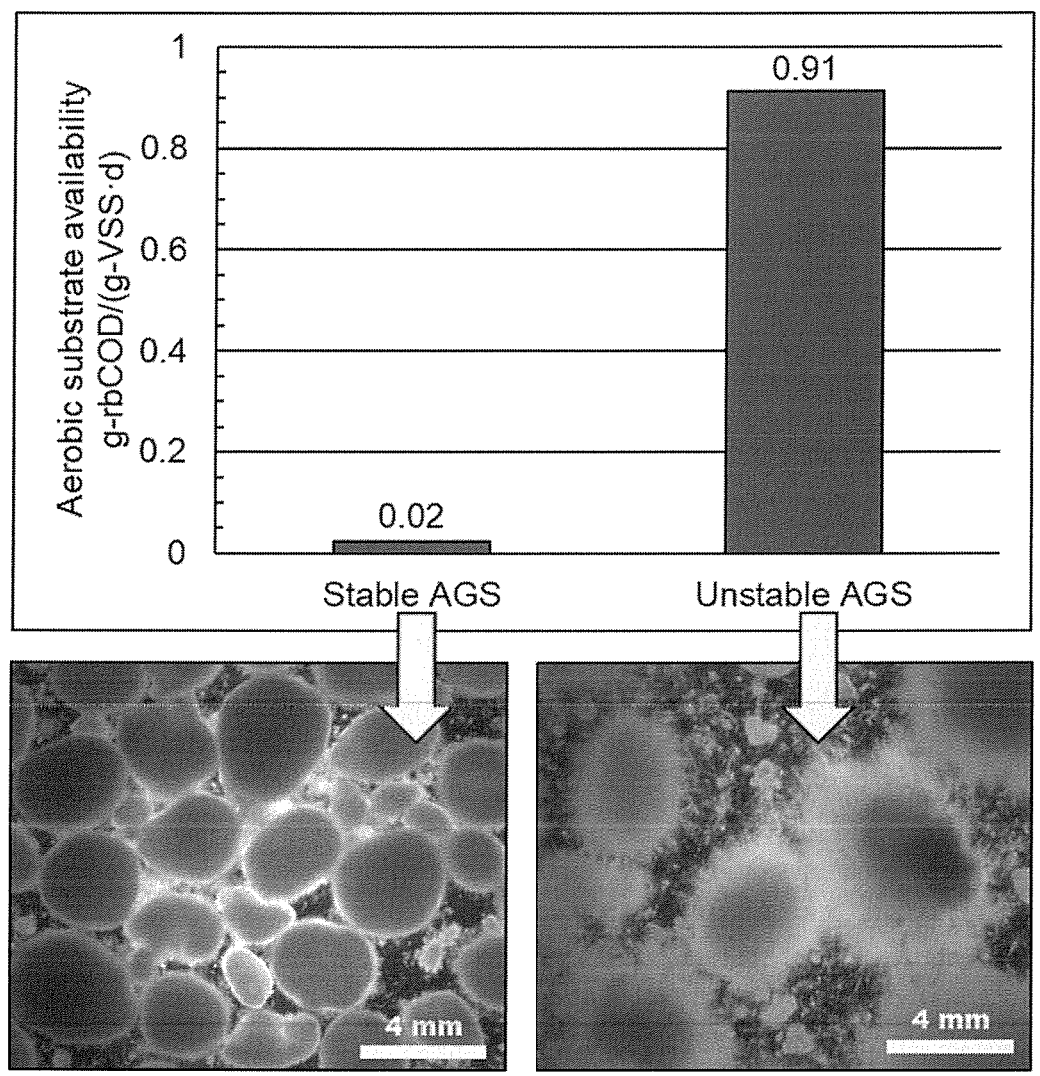
FIG. 2 shows steady-state aerobic granular sludge (AGS) with different magnitudes of readily available substrate breakthrough to aerobic conditions.

One of the key factors for successful and stable granulation is the cultivation of beneficial microorganisms, such as denitrifying glycogen- or phosphate-accumulating microorganisms (He et al., 2016; Pronk et al., 2015a). Accumulating microorganisms are crucial for aerobic granulation because they allow for unifoi m utilization of organic substrate throughout granule depth (De Kreuk et al., 2005). Readily bioavailable organic matter is converted to internal storage products such as polyhydroxyalkoanates during anaerobic periods, thereby redirecting organic substrate from rapidly growing heterotrophic organisms (Devlin et al., 2017)—FIG. 2. Long periods of anaerobic influent distribution, up to 50 minutes, through a settled bed of granules had been demonstrated as beneficial compared to short feeding times (de Kreuk and van Loosdrecht, 2004). However, adaptation of the biomass to the wastewater substrate should be considered to maximize anaerobic substrate utilization during conversion of flocculent processes to AGS (Lochmatter and Holliger, 2014).

Conversely, an aerated influent distribution strategy had commonly been characterized by loose granule structures and a surface layer of filamentous microorganisms (Beun et al., 2002). Filamentous growth has had detrimental effects on the settling properties of AGS and thus on the effluent quality (Martins et al., 2011; Pronk et al., 2015a). Overall, granules formed without an anaerobic influent distribution period are more prone to degranulation (Beun ct al., 2002).

4.3. Alternating Feast and Famine Conditions

Although both GAO and PAO contribute to AGS stability by allowing for uniform utilization of organic substrate throughout granule depth, the development of PAO over GAO is preferred due to their higher density (i.e., better settleability) and ability to perform simultaneous nitrogen and phosphorus removal (Bassin et al., 2012; Winkler et al., 2013). Thus, additional considerations could be made on top of anaerobic influent distribution alone. For instance, extended famine conditions can have a positive effect on aerobic granular sludge stability in this regard (Corsino et al., 2016). Famine conditions develop after bioavailable organic substrate in solution, or substrate as internal storage products, have been utilized. Phosphate-accumulating organisms have been shown to out-compete GAO at low OLR and extended periods of aerobic decay (Carvalheira et al., 2014). This is because PAO have lower biomass decay rates than GAO. Similarly, rapidly growing aerobic microorganisms typically experience higher decay under extended aerobic conditions (i.e., famine conditions). Thus, rapidly growing microorganisms that could contribute to destabilization of AGS are also out-selected.

The development of a famine phase depends on wastewater characteristics, OLR, and the amount of active biomass (de Kreuk et al., 2005). For instance, the presence of slowly hydrolysable biodegradable matter may extend the duration of feast conditions by supplying a constant source of readily biodegradable organics. Furthermore, treatment plants that are nearing design capacity may also lack the quantity of biomass to rapidly reduce the concentration of bioavailable substrate, leading to shorter starvation/famine periods and potentially higher process instability. It had been observed that an imbalance in the feast and famine conditions (i.e., feast conditions >25% the cycle length) led to granule disintegration with upflow anaerobic influent distribution (Corsino et al., 2016).

Figure 3:
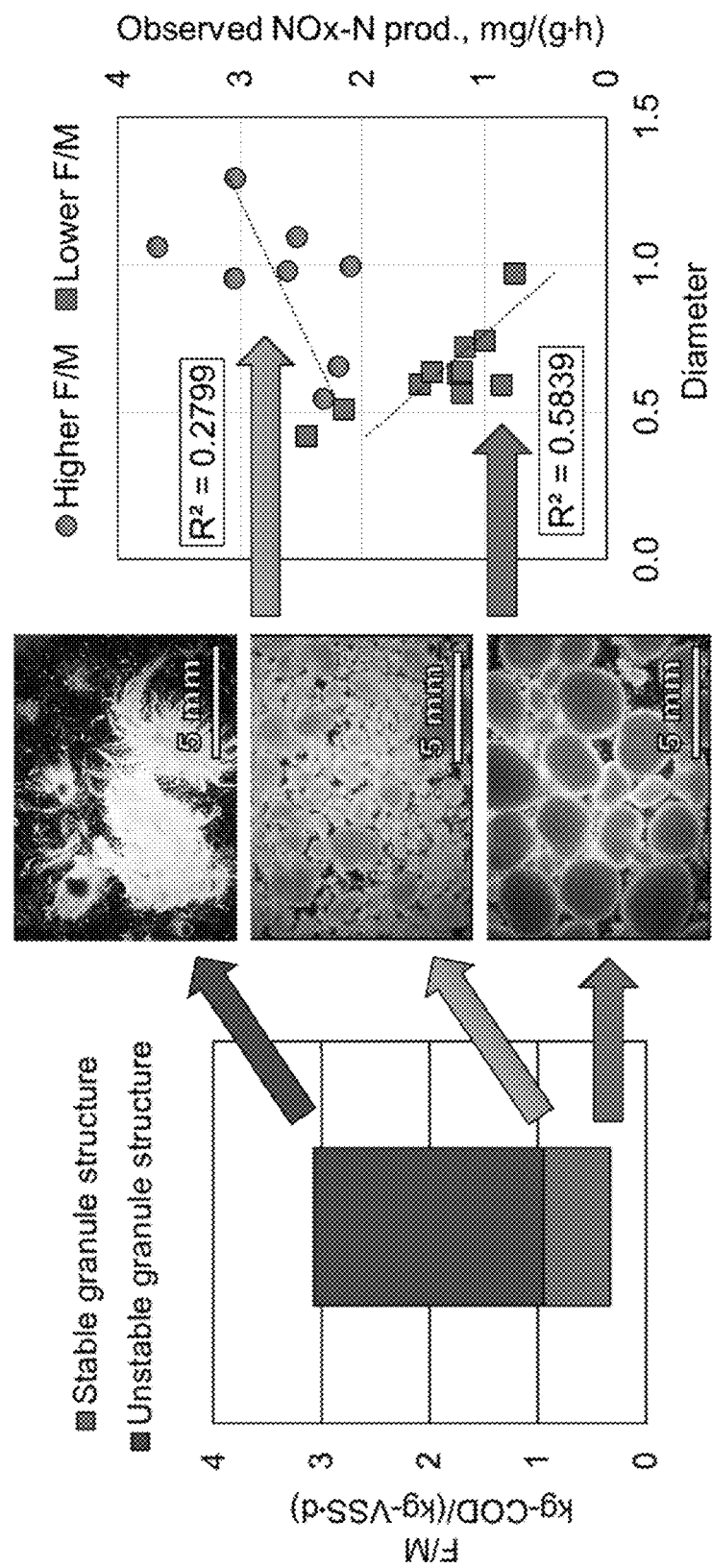
FIG. 3 illustrates, on the left, a relationship between steady-state food to microorganism ratio (F/M) and granule stability in sequencing batch reactors; at the center, stereoscopic images of steady-state aerobic granular sludge; and, on the right, a relationship between observed nitrite/nitrate ($NO_x$-N) production rate and granule diameter for stable granules with low and high F/M.

Further demonstrating the importance of famine conditions was the development of stable granules with more simultaneous nitrification-denitrification (SND) at lower OLR—FIG. 3. Steady-state food to microorganism ratios (F/M) less than 1 kg-COD/(kg-VSS·d) were sufficient for stable granulation under low hydrodynamic shear force (Devlin et al., 2017). Above that value, granules developed a visible filamentous coating that became more excessive as F/M increased up to 3 kg-COD/(kg-VSS·d). As F/M decreased below 1 kg-COD/(kg-VSS·d), the potential for SND increased. Specifically, SND contributed >40% of total nitrogen removal when steady-state F/M was lower than 0.5 kg-COD/(kg-VSS·d). Simultaneous nitrification-denitrification contributed <15% of total nitrogen removal near 1 kg-COD/(kg-VSS·d) (Devlin and Oleszkiewicz, 2018b).

Famine conditions would develop more rapidly at lower F/M, thereby increasing the duration of famine conditions and granule stability. This is because PAO could tolerate prolonged exposure to aerobic and/or anoxic decay while GAO or rapidly growing aerobic heterotrophs would be adversely affected (Carvalheira et al., 2014). Furthermore, at lower F/M there would be more biomass in contact with influent substrate during anaerobic influent distribution. Thus, more influent organic substrate would be utilized anaerobically which would decrease aerobic substrate availability—FIG. 2. Increased anaerobic utilization of organic substrate would increase the potential for SND since organic substrate would be stored within the granules, which have stratified aerobic and anoxic layers, and therefore not subjected to aerobic heterotrophs in bulk solution.

4. Aerobic Granular Sludge in Sequencing Batch Reactors

The first and only commercially available AGS technology was Royal HaskoningDHV's product Nereda®. Royal HaskoningDHV recently licenced the Nereda® process to Aqua-Aerobics Systems, Inc. and has been available in North America as the AquaNereda® process since 2016. Full-scale installations of Nereda® have demonstrated significant improvements with regard to process stability, effluent quality (i.e., TN<5 mg/L; TP<0.3 mg/L), and energy savings (i.e., 30% to 60%) when compared to traditional activated sludge processes (Niermans et al., 2014). Other advantages of the technology included lower capital and operational expenses, and a small physical footprint (de Bruin et al., 2004).

The first full-scale application of Nereda® began in 2005 with a retrofitted milk storage tank treating 250 m$^3$/d of cheese factory waste in Ede, Netherlands (Giesen et al., 2013a). The technology was scaled up for municipal wastewater treatment in 2008 with a 5,000 m$^3$/d demonstration facility at the Gansbaai sewage treatment plant in South Africa (Giesen and Thompson, 2013). Although only required to attain TN less than 15 mg/L and TP less than 10 mg/L, the Gansbaai installation reliably achieved effluent TN of 10 mg/L and TP of 3.2 mg/L (Niermans et al., 2014). Success at the Ede and Gansbaai facilities proved that AGS technology was feasible for full-scale applications of both industrial and municipal wastes. The Gansbaai demonstration in particular allowed applications of Nereda® to expand, starting with the design and construction of Epe WWTP, Netherlands in 2010-2011 (Giesen et al., 2013b). The Epe WWTP has been operational since September 2011 and consists of inlet works with screens and grit removal, followed by three Nereda® reactors and effluent polishing via gravity sand filters (Giesen and Thompson, 2013). At an average flow of 8,000 m$^3$/d the facility has been able to achieve effluent TN of 4 mg/L and TP of 0.3 mg/L with only 60% of the original energy requirements (i.e., 3,500 kWh/d to 2,000-2,500 kWh/d after installation; Niermans et al., 2014).

Nereda® installations continue to push their own limits, and the largest operating design to date was commissioned in 2013 at the 100,000 m$^3$/d Garmerwolde WWTP, Netherlands. The additional capacity gained from two 9,500 m$^3$ Nereda® reactors is 30,000 m$^3$/day, and the tank sizes are similar to the world's largest SBR tanks. The Garmerwolde WWTP has passed the one-year performance test period to validate that combined effluent meets the target of less than 7 mg/L of TN and less than 1 mg/L of TP. Energy consumption of the Nereda® reactors has shown to be 50 to 60% more energy efficient than the existing AB-system that was commissioned in 2005 (Niermans et al., 2014). A retrofit currently underway in Ringsend WWTP, Dublin, Ireland will soon exceed the capacity of Garmerwolde and become the world's largest Nereda® installation at 600,000 m$^3$/d. There are a variety of other Nereda® applications for municipal treatment directly resulting from the Epe WWTP success, with more than 20 WWTP in the international pipeline. However, the Nereda® technology does not offer any solution for existing plug-flow systems that are commonly found across the world.

Figure 4:
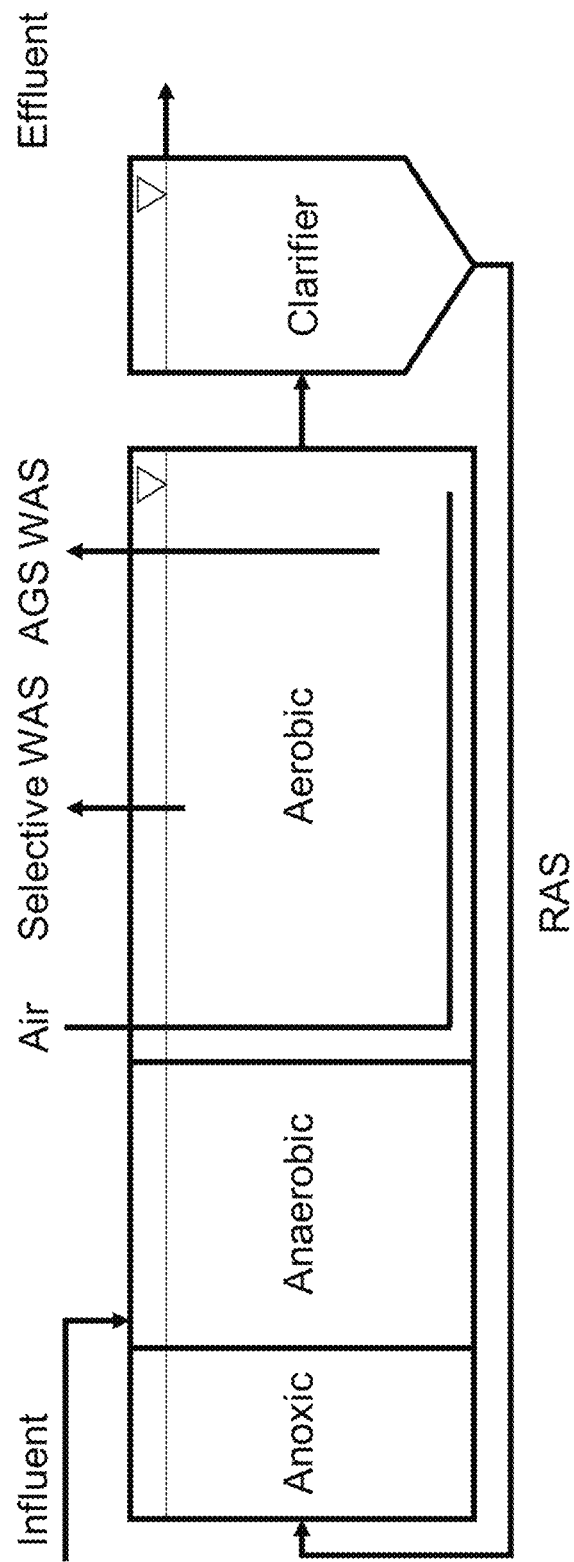
FIG. 4 illustrates a simplified schematic of one of the continuous flow reactor configurations for aerobic granular sludge, in which all influent (i.e., screened and degritted wastewater or primary effluent) is supplied to an anaerobic zone, and waste activated sludge (WAS) for selective wasting and aerobic granular sludge can be drawn from the aerobic zone.

5. Aerobic Granular Sludge for Continuous Flow Reactors 5.1. Proposed Reactor Configuration The configuration of the AGS-CFR in preferred embodiments of the present invention considers a minimum of three discrete zones: 1) an anoxic zone; 2) an anaerobic zone; and 3) an aerobic zone. As shown in FIG. 4, the anoxic zone is situated upstream of the anaerobic zone, which is situated upstream of the aerobic zone. Relative to the influent COD load, the total aerobic volume is preferably designed based on an OLR from 1.5-3 kg-COD/m$^3$/d. The aerobic zone preferably includes at least one baffle or structure that provided adequate separation between the first 10-30% of the aerobic zone and the last 70-90%. The purpose of this separation would be to develop defined feast conditions (i.e., high substrate availability for growth) in the first, smaller compartment or subzone of the aerobic zone, while famine conditions (i.e., low substrate availability for growth) are developed in the second, larger compartment or subzone of the aerobic zone. The presence of defined feast and famine conditions, with approximately 20% of the aerobic volume allocated for feast conditions, has been demonstrated to be beneficial for AGS stability as well as the selection of PAO over GAO (Carvalheira et al., 2014; Santo Fabio Corsino et al., 2016). Additional baffles or structures for separation could be applied in the aerobic zone to likewise create different compartments or subzones to facilitate control strategies for strict effluent nitrogen limits (i.e., TN<5 mg/L).

In the illustrated example, all wastewater influent is supplied through an inlet to the anaerobic zone, where readily available substrates are taken up by PAO and GAO, while more complex substrates would be broken down to less complex substrates (Pronk et al., 2015a). The purpose of the anaerobic zone would be to encourage the development of PAO and GAO, reduce sludge yields by anaerobically degrading complex organic substrates, and direct carbon from the return activated sludge (RAS) that is being recirculated through the return line. Similarly, other alternative locations for the selective wasting port include any elevation of the anoxic or anaerobic zones.

TABLE 1

Design parameters for the proposed aerobic granular sludge continuous flow reactor treating to 10-20° C. wastewater.

| Parameter | Preferred range | Comments |
|---|---|---|
| Configuration | anoxic/anaerobic/aerobic | |
| Type of reactor | combination | anoxic - single CMR/PFR or multiple CMR/PFR in series |
| | | anaerobic - single CMR/PFR or multiple CMR/PFR in series |
| | | aerobic - single PFR or multiple CMR/PFR in series |
| MLSS, mg/L | 2,000-12,000 | ideally 4,000-8,000 |
| OLR, kg-COD/($m^3 \cdot d$) | 0.5-2 | |
| HRT, h | 5-18 | anoxic - 0.5-3[1] |
| | | anaerobic - 1.5-5 |
| | | aerobic - 3-10 |
| SRT light, h | 6-48 | |
| SRT heavy, d | 20-100 | controlled based on MLSS |
| R | 0.2-1 | minimize dilution of substrate |

[1]using endogenous denitrification rate 0.01-0.03 g-N/(g-MLSS · d) and average influent flow towards simultaneous nitrogen and phosphorus removing pathways. Wastewater with a readily bioavailable fraction of COD from 0.2-0.25 would be adequately treated with an anaerobic zone approximately 30-50% the volume of the aerobic zone. As the readily bioavailable fraction of COD increased, the volume of the anaerobic zone could be reduced. Likewise, as the readily bioavailable fraction of COD decreased the volume of the anaerobic zone may be increased to accommodate the degradation of a more complex wastewater substrate.

A solids separation device, for example in the form of a secondary clarifier, resides downstream of the aerobic zone. A return line has an inlet connected to a sludge drain of the solids separation zone, and an outlet that opens into the anoxic zone at the upstream end of the reactor, whereby the return line recycles a stream of return activated sludge (RAS) from the solids separation zone back into the continuous flow reactor. The anoxic zone would be designed based on endogenous respiration to completely remove all nitrites/nitrates in the sludge recycle (i.e., maximum sludge recycle of 100% influent flow). Operating the anoxic zone off endogenous material would act to extend famine conditions, with the intent of out-selecting GAO(Carvalheira et al., 2014; Corsino et al., 2016). However, at lower sludge recycle rates (i.e., minimum sludge recycle of 25% influent flow) the anoxic zone may develop anaerobic conditions resulting in phosphorus release (Mikola et al., 2009). Therefore, the anoxic zone may be equipped with aerator diffusers such that air may be supplied if anaerobic conditions are detected.

As shown in FIG. 4, waste activated sludge (WAS) for selective wasting can be drawn from an elevated location inside the aerobic zone to a selective wasting device installed in operable relation thereto, while aerobic granular sludge can likewise be drawn from the aerobic zone from a lower elevation therein through a lower removal port communicating therewith. Alternatively, the selective wasting device and the removal port may be installed in cooperation with the return line to draw the waste activated sludge, both for selective wasting and wasting of aerobic granular sludge, In addition or alternative to the above described features of the illustrated embodiment, the system and operational process can be modified in numerous ways, including but not limited to:

For example, the process can receive raw industrial, municipal, or combined wastewater at the anaerobic zone with or without primary sedimentation;

For example, the process can be designed as a plug-flow reactor, as a series of completely-mixed reactors, or a combination of CMR and/or PFR in series, whereby it will be appreciated that a "zone" of the reactor may refer to an area of a shared plug flow vessel containing one or more other zones, or to a respective tank or vessel connected in series with other tanks/vessels defining the other zones;

For example, an aeration grid can be added to the anoxic zone to make it a anoxic/aerobic swing zone capable of preventing deep anaerobic conditions from developing and thereby mitigating phosphate release that could be detrimental to biological phosphate removal (Jabari et al., 2017; Mikola et al., 2009). Optionally operating the anoxic zone as a swing zone would also allow for extended starvation/famine conditions, which have been demonstrated to enhance granular sludge stability (Corsino et al., 2016);

For example, a portion of the raw wastewater may be redirected from the main influent inlet through a diversionary intake branch, or a supply of carbon from an external carbon source can be introduced to the anoxic zone through an influent or carbon intake to accelerate denitrification rates (Chen et al., 2013; Makinia et al., 2011) when the nitrite/nitrate load in the return sludge stream is higher than the design load;

For example, a portion of the return activated sludge may be redirected from the main return activated sludge inlet to the anoxic zone through a diversionary branch to an inlet to the aerobic zone. The diversion of a portion of the return activated sludge to the aerobic zone could be utilized to extended famine conditions and minimize the nitrite/nitrate load to the anoxic zone at higher return activated sludge flows.

For example, the operating organic loading rate may be modified such that filamentous overgrowth is avoided (Devlin et al., 2017);

For example, the ratio of anaerobic volume to aerobic volume can be modified based on raw wastewater characteristics, especially the ratio of readily bioavailable substrate to total biodegradable substrates (Jabari et al., 2016);

For example, dissolved oxygen setpoints can be modified (i.e., from 0-6 mg/L) at the front end of the aerobic zone to manage carbon metabolism and facilitate the production of extracellular polymeric substances (Díaz-Barrera et al., 2011) for biofilm formation (Kowalski et al., 2017);

For example, dissolved oxygen setpoints can be modified (i.e., from 0-6 mg/L) in the entire aerobic zone, in space and time, to address ammonium and nitrite/nitrate effluent limits;

For example, chemical addition could be used to maintain operating parameters (e.g., pH, macro- and micronutrients) within a tolerable range (Lashkarizadeh et al., 2016);

For example, the solids separation device may be a clarifier, dissolved air flotation, membranes, or any other proven solids separation device for activated sludge processes;

For example, the selective wasting device could be any device (e.g., upflow partitioning of sludge, hydrocyclones, a modified settling column, or screens) capable of successfully separating low-density biomass from granular sludge;

For example, the aeration system could consist of fine, medium, or coarse bubble diffusers.

5.2. Solid-Liquid Separation

The unit process for solid-liquid separation could be any currently available technology for conventional activated sludge systems. One of the purposes of the proposed AGS CFR is to retrofit CFRs that could benefit from increased capacity and lower effluent nutrient concentrations within the existing footprint. Thus, it is expected that secondary clarifiers will be the most common unit process for solid-liquid separation. The proposed AGS CFR process could potentially be used with membranes, although high sludge recycle rates associated with membrane systems would reduce substrate concentration gradients throughout the reactor and potentially destabilize the AGS. Furthermore, AGS may have a detrimental impact on the frequency of membrane cleaning because of elevated microbial by-products (Corsino et al., 2016).

5.3. Selective Wasting

Figure 5:
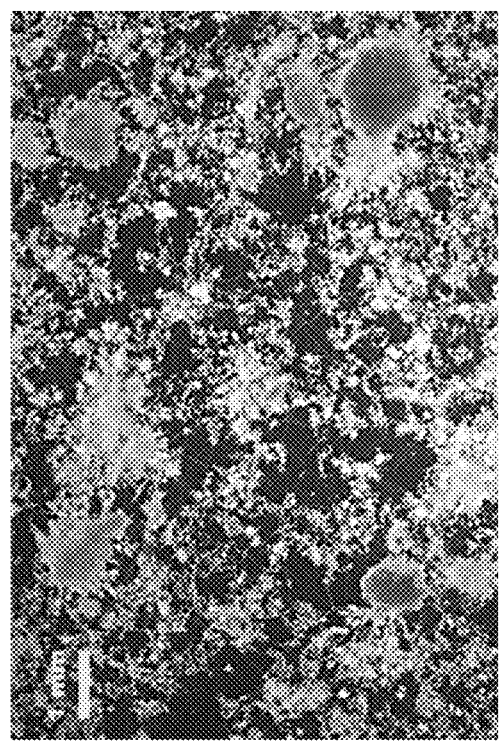
FIG. 5 illustrates, on the left, effluent TSS and phosphate for an aerobic granular sludge sequencing batch reactor treating municipal wastewater after primary sedimentation after inoculation with flocculent biomass; and, on the right, stereoscopic image of biomass from the sequencing batch reactor 40$d$ after inoculation.
Figure 5:
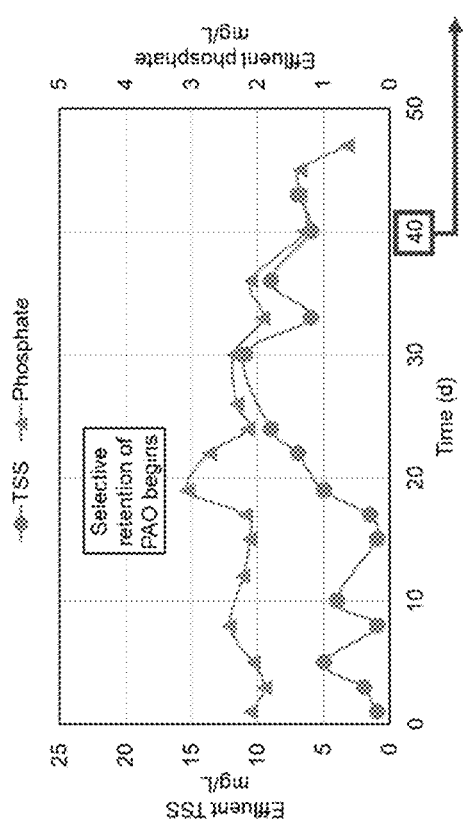

The purpose of selective wasting is to provide a tool for active management of the light fraction of biomass. Management of the light fraction of biomass is important for many reasons including retention of PAO over GAO, reducing sludge yields, and providing exceptional effluent quality with low TSS. A solids retention time (SRT) of 6 h for biomass that settled less than 3 m/h resulted in mature granules with diameters of >1 mm (Devlin et al., 2017). Similarly, an AGS SBR piloted on primary effluent from a municipal wastewater treatment plant, with a critical settling velocity of 3 m/h during the discrete selective wasting phase, maintained effluent solids below 10 mg/L (i.e., 5±3 mg/L) and selectively retained PAO during granulation from flocculent sludge—FIG. 5.

Unit processes for selective wasting are still under development, therefore the exact unit process chosen could be any pre-existing technology (i.e., hydrocyclones or screens) or conceptual unit process that will be developed. Hydrocyclones and screens have typically been applied on return sludge streams to separate either dense or large biomass from light or small biomass, respectively. Hydrocyclones have demonstrated improved settleability of biomass in several cases, although the benefits have so far been limited. For example, a two-year full-scale application of hydrocylone selective wasting at Ejby Mølle WWTP in Denmark resulted in whole sludge SVI that fluctuated from 100-200 mL/g (Sandino et al., 2016). More specifically, whole sludge SVI fluctuated from 100-150 mL/g when the 30-day average SRT was controlled at ~10 d, while SVI fluctuated from 150-200 mL/g when the SRT was 30 d. This demonstrated that aggressive SRT control could out-select the light fraction of biomass and cause a significant reduction in SVI. Other applications of hydrocyclones have resulted in the undesirable retention of high-density, inert material (i.e., grit), with hydrocyclone underflow VSS approaching 40% (Ford et al., 2016). These studies suggested that any granular sludge process, which selects for dense material, should have adequate grit removal upstream of the biological process.

Physical screening as a selective pressure is still in the assessment phase although some promise has been demonstrated (Van Winckel et al., 2016). A mainstream CMR pilot with screening for selective wasting had generated 4.5% biomass with settling class >9 m/h while the existing full-scale WWTP contained no biomass in that settling class. However, the application of screens for selective wasting is limited since it requires biomass greater than the selection size to be present in the reactor. Hydrocyclones and other density-dependent selective wasting devices take advantage of the higher density that PAO exhibit over GAO, allowing for desirable microorganisms to be retained without a limit on the size of granules. However, the selection pressure produced by hydrocyclones depends on flow and would not be flexible if lower or higher selection pressures were desired. Thus, there is still a demonstrated need to develop new unit processes for selective wasting that allow for changes in the applied selection pressure, especially during conversion of flocculent biomass to AGS when too high a selection pressure may result in premature washout of biomass (Derlon et al., 2016).

5.4. Control System

Many individual control loops would contribute to the control system of a stable AGS CFR. The first control system would monitor dissolved oxygen (DO) and other parameters in the aerobic zone. The simplest configuration, which would separate the aerobic zone into two discrete compartments or subzones (i.e., feast and famine), would control DO in the first aerobic compartment/subzone via a setpoint and DO in the second aerobic compartment/subzone via measured ammonium concentrations. A lower DO limit, such as 0.05-0.5 mg/L, would be applied in the second aerobic compartment/subzone to maintain an aerobic environment if the minimum ammonium concentration was achieved. In the case of more stringent effluent nitrogen limits (i.e., TN<5 mg/L) and/or low carbon to nitrogen ratio in the influent, additional process controls could be added. Keeping with the simplest configuration (i.e., two aerobic compartments/subzones), online nitrite/nitrate monitoring could be implemented and linked to a carbon dosing system. If the total nitrite/nitrate concentration exceeded requirements, methanol or another carbon source providing low biomass yields could be dosed to the second aerobic compartment/subzone while the lower DO limit was operated (i.e., 0.05-0.5 mg/L). In these cases, the volume of the second aerobic compartment/subzone would have to be extended to guarantee that ammonium would be within allowable concentrations while denitrification on external carbon source was occurring. Otherwise, a more complex configuration with additional baffles or structures for flow separation within the second aerobic compartment/subzone (i.e., famine conditions), as well as additional probes for the separated compartments, could be employed with multiple carbon dosing locations. This would allow for optimal control of nitrification, denitrification, carbon dosing, and famine conditions, thereby providing the most robust control system to meet low effluent nitrogen concentrations (i.e., TN of 3 mg/L).

The second control system, in its simplest form, would monitor oxidation reduction potential (ORP) in the anoxic zone and turn aeration on if the ORP registered anaerobic conditions. The anoxic zone would serve two purposes, the first being a conventional purpose; preventing nitrite/nitrate carryover to the anaerobic zone. The second, novel purpose would be to serve as extended famine conditions for the AGS CFR since the anoxic zone would be designed based on endogenous respiration. At low sludge recycle rates, especially while the AGS CFR was under capacity, the ORP may drop, resulting in anaerobic conditions. If this were to happen the anoxic zone would no longer serve as extended famine conditions (i.e., lack of electron acceptors) and secondary phosphorus release could occur (Mikola et al., 2009). Thus, it would be important to maintain ORP above anaerobic conditions, through aeration, to benefit system stability. The second control system could be built upon through the addition of a nitrite/nitrate probe and carbon dosing system (i.e., methanol or equivalent). As the AGS CFR begins to reach capacity, or if influent carbon to nitrogen ratio was low, endogenous respiration may not be economical to completely reduce all nitrite/nitrate in the sludge recycle. Thus, a nitrite/nitrate probe could be used to monitor oxidized nitrogen species in the anoxic zone, and turn on carbon dosing when nitrite/nitrate concentration exceeded desired values.

mentation. The AGS-CFR reactor consisted of a 100 L anoxic zone, 200 L anaerobic zone, and a 400 L aerobic zone, and was designed based on results from lab-scale experimentation (Devlin and Oleszkiewicz, 2018a). The anaerobic zone consisted of two compartments, the first 90 L and second 110 L. Similarly, the aerobic zone consisted of two compartments, the first 140 L and second 260 L. Wastewater was pumped into the first anaerobic compartment and mixed liquor flowed via gravity through the process. Solid-liquid separation was achieved with a 120 L clarifier.

Return activated sludge was pumped from the anoxic zone to the first anaerobic compartment or subzone. Optical probes monitored DO in both aerobic compartments/subzones and the DO set-points were maintained between 0.2-5.5 mg/L in the first aerobic compartment/subzone and between 0.2-2.5 mg/L in the second aerobic compartment/subzone. Return activated sludge was pumped at a rate of 50-70% of the influent flow. Selective wasting was perfoi Hied in a 5½" diameter 12 L mixed settling column. Four influent ports were located equidistant along circumference of the mixed settling column at 80% of the column height. Influent for selective wasting was drawn from the top of the second aerobic compartment/subzone. Dense sludge was returned to the second aerobic compartment from a single port located at the bottom of the mixed settling column. Overflow from the mixed settling column was discharged as waste activated sludge. The mixed settling column was mixed with three 5" diameter right-handed propellers rotating clockwise at 7 rpm. One propeller was located ½" above the bottom of the mixed settling column while the remaining two propellers were spaced 4½" apart. Selective wasting was not implemented until 120 d after inoculation. The SRT of the selectively wasted fraction was maintained at 4 d.

Primary effluent characteristics included TSS of 50±40 mg/L, COD of 310±70 mg/L, filtered flocculated COD of 85±10 mg/L, TN of 45±9 mg/L, and TP of 5.3±0.8 mg/L. Average temperature of the second aerobic compartment had

TABLE 2

Summary of preferred and optional probes and their applications in the proposed aerobic granular sludge continuous flow reactor.

| Zone | Probe | Purpose |
|---|---|---|
| Anoxic | ORP - preferred | ORP - prevent deep anaerobic conditions from developing by switching aeration blower on/off. |
|  | $NO_x$—N - optional | $NO_x$—N - for wastewaters with low COD/N ratios that may benefit from additional carbon input (e.g., methanol) to the anoxic zone for complete denitrification in the return sludge stream. |
| Anaerobic | ORP - preferred | ORP - monitor status of anaerobic conditions and raise alarm if ORP increases above an upper limit. |
| Aerobic | DO - preferred | DO - monitor DO in all aerobic compartments and maintain DO setpoints in the first aerobic, compartment by switching aeration blower on/off. |
|  | $NH_4$—N - preferred | $NH_4$—N - switch aeration blower on/off in second aerobic compartment based on monitored $NH_4$—N conditions. |
|  | $NO_x$—N - optional | $NO_x$—N - for wastewaters with low COD/N ratios or strict TN limits that may benefit from additional carbon input (e.g., methanol) to the second or subsequent aerobic compartments for enhanced denitrification. |

[1] based on endogenous denitrification rates of 0.01-0.03 g-N/(g-MLSS · d)

5.5. Preliminary Piloting Results

The disclosed anoxic/anaerobic/aerobic process generated AGS from flocculent sludge in a 700 L continuous flow reactor treating municipal wastewater after primary sedimentation. been 19±1° C. During start-up the HRT was maintained at 12 h. After a month of operation, the HRT was decreased to 6 h. A SVI of 72±9 mL/g with 70±10% of the settling occurring after 5 min had been achieved on municipal primary effluent, without selective wasting. Granules were 0.2-0.5 mm in diameter. The biomass concentration had plateaued at approximately 4.2 g-TSS/L. After selective wasting was initiated after 120 d of operation the biomass concentration dropped and became steady at 3.5 g-TSS/L. No significant change in SVI was observed with selective wasting. Effluent phosphate and ammonium have averaged below 0.2 mg/L, with total inorganic nitrogen fluctuating from 15-20 mg/L and effluent TSS <20 mg/L. Total nitrogen is expected to decrease as granular sludge maturity improves.

Preliminary pilot results have demonstrated successful granulation on municipal primary effluent even without selective wasting. These results demonstrated the importance of minimizing rapid growth on organic substrate under aerobic conditions, which may be more important for stable granulation than selective wasting alone. Future studies are being contemplated to re-evaluate granulation potential in the presence of selective wasting, with the SRT of the selectively wasted fraction controlled at decreasing intervals from 0.25 to 4 d.

6. Summary

Aerobic granular sludge can be cultivated and stably operated under continuous flow. Minimizing the growth potential of organic substrate in bulk solution during aeration was a critical factor governing granular sludge stability in continuous flow. By maximizing anaerobic substrate utilization and applying a low DO phase during feast conditions, a stable AGS can be generated in continuous flow. These design and operational principles can be applied to retrofit existing continuous flow reactors into AGS processes with an anoxic/anaerobic/aerobic configuration.

Since various modifications can be made in this invention as herein above described, and many apparently widely different embodiments of same made, it is intended that all matter contained in the accompanying specification shall be interpreted as illustrative only and not in a limiting sense.

The invention claimed is:

1. An activated granular sludge continuous flow reactor (AGS-CFR) comprising:
    an anaerobic zone having inlet through which influent is introduced to the AGS-CFR and said anaerobic zone comprising one or more completely-mixed reactors (CMR) or plug-flow reactor (PFR);
    an aerobic zone situated downstream of anaerobic zone and comprising at least one PFR or multiple CMR in series;
    an anoxic zone situated upstream of the anaerobic zone and said anoxic zone comprising one or more additional CMR or PFR;
    a solids separation device situated downstream of the aerobic zone;
    a return line having an inlet arranged to receive a supply of return activated sludge from the solids separation device and an outlet that feeds into the anoxic zone to deliver at least some of said return activated sludge thereto, wherein said return activated sludge includes aerobic granular sludge; and
    an aeration unit in the anoxic zone to enable selective operation thereof as an anoxic/aerobic swing zone.

2. The AGS-CFR of claim 1 comprising a selective wasting device installed in cooperable relation with the aerobic zone, the anoxic zone, the anaerobic zone, or the return line for selective wasting of waste activated sludge therefrom.

3. The AGS-CFR of claim 1 comprising a removal port in communication with the aerobic zone, the anoxic zone, the anaerobic zone, or the return line and arranged for withdrawal of aerobic granular sludge therefrom through said removal port.

4. The AGS-CFR of claim 1 comprising a carbon or influent intake at the anoxic zone to enable introduction of external carbon or wastewater thereto to accelerate denitrification of the return activated sludge received therein.

5. The AGS-CFR of claim 1 wherein the aerobic zone comprises a first subzone for developing feast conditions therein, and a second subzone for developing famine conditions therein, said second subzone being downstream of and larger than said first subzone.

6. An activated granular sludge continuous flow reactor (AGS-CFR) comprising:
    an anaerobic zone having inlet through which influent is introduced to the AGS-CFR and said anaerobic zone comprising one or more completely-mixed reactors (CMR) or plug-flow reactor (PFR);
    an aerobic zone situated downstream of anaerobic zone and comprising at least one PFR or multiple CMR in series;
    an anoxic zone situated upstream of the anaerobic zone and said anoxic zone comprising one or more additional CMR or PFR;
    a solids separation device situated downstream of the aerobic zone; and
    a return line having an inlet arranged to receive a supply of return activated sludge from the solids separation device and an outlet that feeds into the anoxic zone to deliver at least some of said return activated sludge thereto, wherein said return activated sludge includes aerobic granular sludge;
    wherein:
    the aerobic zone comprises a first subzone for developing feast conditions therein, and a second subzone for developing famine conditions therein, of which said second subzone is downstream of and larger than said first subzone; and
    the aerobic zone comprises at least one PFR, and said at least one PFR comprises at least one baffle separating the first subzone from the second subzone.

7. The AGS-CFR of claim 6 comprising an aeration unit in the anoxic zone to enable selective operation thereof as an anoxic/aerobic swing zone.

8. The AGS-CFR of claim 6 wherein the first subzone occupies 10-30% of the aerobic zone.

9. The AGS-CFR of claim 6 wherein the second subzone occupies 70-90% of the aerobic zone.

10. An activated granular sludge continuous flow reactor (AGS-CFR) comprising:
    an anaerobic zone having inlet through which influent is introduced to the AGS-CFR and said anaerobic zone comprising one or more completely-mixed reactors (CMR) or plug-flow reactor (PFR);
    an aerobic zone situated downstream of anaerobic zone and comprising at least one PFR or multiple CMR in series;
    an anoxic zone situated upstream of the anaerobic zone and said anoxic zone comprising one or more additional CMR or PFR;
    a solids separation device situated downstream of the aerobic zone; and
    a return line having an inlet arranged to receive a supply of return activated sludge from the solids separation device and an outlet that feeds into the anoxic zone to deliver at least some of said return activated sludge thereto, wherein said return activated sludge includes aerobic granular sludge;

wherein the return line comprises a diversionary branch feeding a portion of the return activated sludge to the aerobic zone.

11. A method of treating wastewater in a continuous flow reactor, said method comprising:

introducing said wastewater into an anaerobic zone of said continuous flow reactor, said anaerobic zone residing downstream of an anoxic zone of said continuous flow reactor and upstream of an aerobic zone of said continuous flow reactor; and from a solids separation device of said continuous flow reactor that is situated downstream of said aerobic zone, collecting a supply of return activated sludge that includes aerobic granular sludge, and directing at least some said return activated sludge into the anoxic zone; and aerating the anoxic zone to operate same as an anoxic/aerobic swing zone.

12. The method of claim 11 comprising selectively wasting waste activated sludge from the aerobic zone.

13. The method of claim 11 comprising selectively wasting waste activated sludge from said return activated sludge.

14. The method of claim 11 comprising removing aerobic granular sludge from the aerobic zone.

15. The method of claim 11 comprising removing aerobic granular sludge from said return activated sludge.

16. The method of claim 11 comprising introducing carbon or wastewater to the anoxic zone to accelerate denitrification of the return activated sludge received therein.

17. The method of claim 11 comprising developing feast conditions in a first subzone of the aerobic zone and famine conditions in a second subzone of the aerobic zone, wherein the second subzone is downstream of and larger than said first subzone.

18. The method of claim 17 wherein the first subzone occupies 10-30% of the aerobic zone.

19. The method of claim 17 wherein the second subzone occupies 70-90% of the aerobic zone.

20. A method of treating wastewater in a continuous flow reactor, said method comprising:

introducing said wastewater into an anaerobic zone of said continuous flow reactor, said anaerobic zone residing downstream of an anoxic zone of said continuous flow reactor and upstream of an aerobic zone of said continuous flow reactor;

developing feast conditions in a first subzone of the aerobic zone and famine conditions in a second subzone of the aerobic zone, of which the second subzone is downstream of and larger than said first subzone; and from a solids separation device of said continuous flow reactor that is situated downstream of said aerobic zone, collecting a supply of return activated sludge that includes aerobic granular sludge, and directing at least some said return activated sludge into the anoxic zone;

wherein the continuous flow reactor comprises at least one baffle separating the first subzone from the second subzone.

21. The method of claim 20 comprising aerating the anoxic zone to operate same as an anoxic/aerobic swing zone.

22. A method of treating wastewater in a continuous flow reactor, said method comprising:

introducing said wastewater into an anaerobic zone of said continuous flow reactor, said anaerobic zone residing downstream of an anoxic zone of said continuous flow reactor and upstream of an aerobic zone of said continuous flow reactor;

from a solids separation device of said continuous flow reactor that is situated downstream of said aerobic zone, collecting a supply of return activated sludge that includes aerobic granular sludge, and directing at least some said return activated sludge into the anoxic zone; and The method of claim 11 comprising diverting a portion of the return activated sludge to the aerobic zone.

* * * * *